(12) United States Patent
Bauer et al.

(10) Patent No.: US 7,011,785 B2
(45) Date of Patent: Mar. 14, 2006

(54) PROCESS FOR PRODUCING HOLLOW BODIES COMPRISING FIBER-REINFORCED CERAMIC MATERIALS

(75) Inventors: Moritz Bauer, Augsburg (DE); Michael Heine, Allmannshofen (DE); Andreas Kienzle, Thierhaupten (DE); Ronald Huener, Baar (DE); Andreas Rahn, Wertingen (DE); Rainer Zimmermann-Chopin, Ellgau (DE)

(73) Assignee: SGL Carbon AG, (DE)

( * ) Notice: Subject to any disclaimer, the term of this patent is extended or adjusted under 35 U.S.C. 154(b) by 329 days.

(21) Appl. No.: 10/328,413

(22) Filed: Dec. 23, 2002

(65) Prior Publication Data
US 2003/0168757 A1 Sep. 11, 2003

(30) Foreign Application Priority Data
Dec. 31, 2001 (DE) ................................ 101 64 627

(51) Int. Cl.
*B29C 35/08* (2006.01)
*B29C 67/00* (2006.01)
*B28B 7/28* (2006.01)
*C01B 31/00* (2006.01)

(52) U.S. Cl. .................... 264/405; 249/175; 264/29.1; 264/29.2; 264/29.7; 264/122; 264/125

(58) Field of Classification Search ............. 264/405, 264/496, 29.1, 29.2, 29.7, 122, 125; 249/175
See application file for complete search history.

(56) References Cited

U.S. PATENT DOCUMENTS

| | | | |
|---|---|---|---|
| 4,847,063 A | 7/1989 | Smith | |
| 5,282,734 A | 2/1994 | Pastureau | |
| 6,086,814 A | 7/2000 | Krenkel et al. | |
| 6,328,834 B1 | 12/2001 | Rebstock et al. | |
| 6,699,427 B1 * | 3/2004 | Huang et al. | 264/434 |

FOREIGN PATENT DOCUMENTS

| | | |
|---|---|---|
| DE | 197 10 105 A1 | 9/1998 |
| DE | 197 11 829 C1 | 10/1998 |
| DE | 198 24 571 A1 | 12/1999 |
| DE | 198 56 721 A1 | 6/2000 |
| DE | 198 34 571 | 7/2001 |
| EP | 0 461 980 | 12/1991 |
| EP | 0 788 468 | 8/1997 |
| EP | 0 788 468 B1 | 8/1997 |
| FR | 1 563 485 | 3/1969 |
| WO | WO-96/13470 | 5/1996 |

* cited by examiner

*Primary Examiner*—Stephen J. Lechert, Jr.
(74) *Attorney, Agent, or Firm*—Connolly Bove Lodge & Hutz LLP

(57) ABSTRACT

Process for producing hollow bodies comprising fiber-reinforced ceramic materials, where mold cores whose shape corresponds to that of the hollow spaces are produced in a first step, at least one mold core together with a press moulding composition or formable fiber composition are introduced into a mold, where the press moulding composition comprises carbon fibers and/or carbon filaments and thermally curable carbonizable binders, in such a way that the position of the cores corresponds to the desired position of the hollow spaces to be formed in a second step, the composition is cured in a third step by heating to a temperature of from 120° C. to 280° C., to give a green body, the strengthened green body is carbonized and or graphitized in a fourth step by heating in a nonoxidizing atmosphere to a temperature of from about 750° C. to about 2400° C. to form a C/C body, wherein heating in the third and/or fourth step is at least partly effected by an electric current being passed through the pressable composition or the green body and through at least one mold core, hollow bodies produced in this way and their use for producing clutch disks or brake disks, in particular for automobiles

9 Claims, No Drawings ic in aircraft applications. The high hardness and wear resistance of C/SiC components allows to achieve far longer operating lives compared to previously customary materials based on C/C or metal.
PROCESS FOR PRODUCING HOLLOW BODIES COMPRISING FIBER-REINFORCED CERAMIC MATERIALS

FIELD OF THE INVENTION

The present invention relates to a process for producing hollow bodies comprising fiber-reinforced ceramic materials. In particular, the invention relates to a process for producing a porous fiber-reinforced carbon-containing shaped body which has recesses or hollow spaces and is close to the final shape ("near net shape"), in particular a fiber-reinforced C/C body ("CFC" or "CFRC"=carbon fiber reinforced carbon) which is shaped from binder-containing fiber compositions by means of a press moulding procedure using pressing cores or mold cores and is converted into C/C in a subsequent thermal treatment, and also, if appropriate, the post-densification of a porous fiber-reinforced carbon-containing shaped body to form a ceramic matrix, in particular by infiltration of the C/C body with a liquid metal, if appropriate with subsequent heat treatment, so that the matrix then comprises metals and metal carbides formed by reaction with carbon, possibly together with residual unreacted carbon.

The process of the invention relates particularly to the production of ceramic composite materials which are reinforced with carbon fibers and have recesses and hollow spaces and which are converted by infiltration with a silicon melt so as to react with at least part of the carbon to form silicon carbide into composite materials which are reinforced with carbon fibers and have an SiC-, Si- and C-containing matrix (C/SiC or C/C—SiC materials). These composite materials are employed, in particular, in brake disks, clutch disks and friction disks and also as high temperature-resistant construction materials.

BACKGROUND OF THE INVENTION

Materials used for brake disks in the automotive field are nowadays predominantly steel or gray cast iron, and in aircraft applications, of carbon materials reinforced with carbon fibers (C/C). The properties required of the disk materials are high mechanical stability, heat resistance, hardness and wear resistance in the friction pair of the brake. The use temperature of gray cast iron brake disks used hitherto is limited by the melting point of the material. The temperature at which mechanical failure occurs is, depending on the stress, significantly below the melting point. Furthermore, there is a risk of cracking of the disks due to transformation of the metallic microstructure on heating. The use of fiber-reinforced ceramic as a material for brake disk applications has been found to be a solution to these problems. Materials based on silicon carbide reinforced with carbon fibers (C/SiC) in particular have been found useful for this application. The advantages of this material are their lower density (thus reduced weight for a given volume), their high hardness and heat resistance up to about 1400° C. and, not least, the extremely high wear resistance. The significantly reduced density of brake disks made of these C/SiC materials improves comfort and safety by reduction of the unsprung masses in motor vehicles, and also economics in aircraft applications. The high hardness and wear resistance of C/SiC components allows to achieve far longer operating lives compared to previously customary materials based on C/C or metal.

Processes for producing C/SiC components have been known from, for example, DE-A 198 56 721, DE-C 197 11 829 and DE-A 197 10 105 and comprise, inter alia, the following steps:
preparation of a pressable mixture or formable fiber composition comprising, firstly, carbon-containing fibers or fiber bundles which may be coated and, secondly, fillers and/or thermally curable binders such as resins and/or pitch,
shaping of the formable fiber composition or the pressable mixture under pressure and curing at elevated temperature and carbonization of the carbon-containing fillers and binders to produce a shaped body, in particular a shaped body comprising carbon reinforced with carbon fibers (C/C) and, if appropriate, subsequent graphitization,
infiltration of at least an outer layer of the shaped body with a silicon melt and at least partial reaction with the carbon in the shaped body to produce SiC, thus forming a shaped body which comprises, at least in the outer layer, a composite ceramic composed of carbon-containing fibers embedded in a matrix comprising predominantly SiC, Si and C (hereinafter referred to as C/SiC).

In the following, the term C/SiC also encompasses the material variant in which, as described above, only an outer layer is silicized.

The term "formable fiber composition" encompasses both the fiber-containing press moulding compositions which typically comprise short fibers or short fiber bundles and also fibre mats, woven fabrics or nonwovens which can be processed, for example, by the prepreg technique. The latter can also, in particular, be shaped virtually without or completely with very little or no pressure. Customary production processes also include those in which the C/C body is post-densified via the liquid or gas phase with carbon precursors, namely substances which form carbon on heating in the absence of oxidizing media, or by means of carbon, or the matrix comprising predominantly SiC, Si and C is produced by gas-phase infiltration (CVD, chemical vapor deposition, or CVI, chemical vapor infiltration) or by pyrolysis of Si-containing preceramic polymers.

Present-day metallic brake disks frequently have ventilation slits or ventilation channels through which air flows within the disk so as to reduce the temperature of the disk and decrease wear of the friction lining under high stress. Such ventilation channels are also employed in brake disks based on C/SiC, particularly to lower the temperature so as to spare the brake linings and further components of the system.

One process for producing friction units of C/C—SiC material having ventilation channels, hollow spaces and recesses in which a structured porous carbon body close to the final shape is infiltrated with liquid silicon has been known from EP-B 0 788 468. This process makes use of the fact that liquid silicon infiltration and formation of the Si- and SiC-rich composite matrix occurs virtually without changes to the geometry of the C/C intermediate body, so that the hollow spaces and recesses can be produced in the relatively soft and readily machinable C/C intermediate body and not only in the very hard C/C—SiC composite ceramic.

In DE-C 198 24 571, a further process is proposed for producing hollow spaces in a workpiece comprising C/SiC composite ceramics. The hollow spaces are formed in manufacture of the preform by pressing using cores of silicon, silicon alloys or Si/BN mixtures. The cores are not removed from the preform until the step of infiltration with liquid silicon, and serve as a source of silicon for the silicization. Before silicization, the preform has to be heated and converted into a C/C intermediate body, with decomposition of the organic constituents, for example binders, and shrinking of the preform. This shrinkage leads to the preform shrinking onto the silicon-containing cores which in turn additionally undergo a thermal expansion due to heating. In general, undesirable stresses or even fractures occur in the preform as a result, which have to be avoided.

In the thermal curing of the press moulding or formable fiber compositions, which is generally carried out simultaneously with application of pressure, the heat required is usually introduced into the workpiece from the outside. This is achieved by heating the mold, the press or the punch, or by introducing the workpieces into a furnace. Here, the outer region of the workpiece is heated to higher temperatures than the inner region, so that the heat can be transported into the interior of the workpiece by means of the temperature gradient. This nonuniform heating can lead to stresses in the workpiece; the chemical and physical processes occurring in the outer zone can even lead, for example, to gases liberated during heating and the chemical reactions occurring as a result not being able to escape through the outer zone and contributing to rupture of the workpiece or to cracks in the workpiece.

The German patent application No. DE-A 101 64 231, filed at the same time discloses the use of press moulding compositions which, at least during pressing, have an electrical conductivity of at least 0.1 S/m and are heated by passing electric current through them so as to generate Joule heat before, during or after pressing. However, if attempts are made to apply such a process to green bodies or pressing compositions which contain electrically insulating mold cores, it is observed that local overheating can occur due to the nonuniform cross sections of the conductive regions and ruin the desired effect of uniform heating of the workpiece. Likewise, mold cores having an excessively high conductivity are also unsuitable since they short-circuit the heating current without producing a sufficient heating effect.

It is therefore an object of the invention to provide a process suitable for producing hollow bodies comprising fiber-reinforced composites which are subsequently converted into shaped bodies comprising fiber-reinforced carbide ceramic by infiltration with liquid metals, in particular liquid silicon and subsequent reaction.

SUMMARY OF THE INVENTION

According to the invention, this object is achieved by using press moulding compositions or formable fiber compositions which have, at least during the pressing process, an electrical conductivity of at least 0.1 S/m and are heated by passing electric current through them so as to generate Joule heat before, during or after pressing or shaping of the formable fiber composition and by simultaneously using electrically conductive mold cores, with the conductivity of molding composition and cores being matched so that uniform heat evolution is achieved both during pressing or shaping and during curing to produce the green body.

It has been found to be advantageous for the conductivity of the cores to be from 0.1 to 100 times the conductivity of the press moulding composition, preferably from 0.25 to 30 times and in particular from 0.5 to 10 times the conductivity of the press moulding or formable composition. The value given for the conductivity of the press moulding or formable composition is based on the states before, during and directly after the pressing process.

The invention accordingly provides a process for producing hollow bodies comprising fiber-reinforced ceramic materials, where cores whose shape corresponds to that of the hollow spaces are produced in a first step, a green body is produced in a second step by introducing the abovementioned mold cores and a formable fiber composition into a mold, where the fiber composition comprises carbon fibers and/or carbon fiber bundles and/or woven carbon fabrics, which have preferably been coated with carbon or carbon-containing compounds, and carbonisable binders, in such a way that the position of the cores corresponds to the desired position of the hollow spaces to be formed, curing is carried out by heating to a temperature of from 120° C. to 280° C., if appropriate under pressure in a third step, the cured green body, also referred to as intermediate body, is carbonized and/or graphitized in a fourth step by heating in a nonoxidizing atmosphere to a temperature of from about 750° C. to about 2400° C. to give a C/C body, and, if desired, the C/C body is infiltrated with liquid metal with retention of its shape in a fifth step, with at least partial reaction of the carbon present in the matrix of the C/C body with the metal to form carbides occurring, wherein heating in the third and/or fourth step is at least partly effected by an electric current being passed through the green body which has been structured by means of cores and/or the strengthened intermediate body.

DETAILED DESCRIPTION OF THE PREFERRED EMBODIMENTS

Reusable or lost cores can be used as electrically conductive mold cores. Reusable mold cores typically comprise metals.

As lost cores, use is typically made of polymers whose melting point or decomposition temperature is at least 30° C. above the temperature at which the compositions are cured to give the green body. The electrical conductivity of the polymers is preferably achieved by the mold cores containing volume fraction of at least 5% of electrically conductive fibers and/or electrically conductive particles. The electrical conductivity of the lost cores is typically at least 0.01 S/m, preferably at least 1 S/m and particularly preferably in the range from 1 to 100 S/m. The electrically conductive fibers are preferably selected from the group consisting of carbon fibers, graphite fibers, carbon-coated fibers, metal fibers, metal turnings and metal whiskers, and the electrically conductive particles are preferably selected from the group consisting of carbon particles, graphite particles, carbon black, metal grains, metal powder, metal flakes and metal grit. Particularly preferred metals for the core or filler are Al, Si, Ti, Cr and Fe.

The process of the present invention provides for press moulding compositions comprising carbon fibers, thermally curable binders and, in particular, carbon-containing additives to be pressed in the third step to form green bodies having hollow spaces and/or recesses.

The carbon fiber layers of the C/C intermediate body are preferably built up in the vicinity of the core in a predetermined preferential direction of the carbon reinforcing fibers on the core. For this purpose, preference is given to using press moulding compositions which comprise carbon fibers having a mean length of at least 50 mm. The press moulding composition of the second step is then preferably introduced into the mold in such a way that the carbon fibers are predominantly oriented parallel to the direction of the highest tensile stress in the resulting shaped part. In this context, predominantly means at least 50%. It is also possible to wind tapes made of parallel and bound carbon threads (also known as "UDTs"=unidirectional tapes) around the cores, and to fix this sheath by means of thermally curable binders if necessary. Further pressable compositions containing short fibers or fiber bundles are then usually applied on top of this layer of preferentially oriented carbon fibers or threads.

In another preferred embodiment, carbon fibers are used in the form of coated short fiber bundles. Particular preference is here given to fibers or fiber bundles which are coated with graphitized carbon and have mean lengths of at most 50 mm.

As thermally curable binders, use is made of pitches such as coaltar pitch or petroleum pitch and/or preferably curable resins such as phenolic resins, epoxy resins, polyimides, filler-containing mixtures with furfuryl alcohol or furan resins. The compositions are, for this purpose, introduced into a pressing mold which is provided with "lost cores". The cores occupy the space of the hollow spaces or recesses to be formed later in the composite ceramic. After the pressing mold has been filled, the composition is pressed and cured under the action of heat.

After carbonization of the green body, any pyrolysis residues or carbon residues present in the hollow spaces formed are removed, and a porous C/C body having hollow spaces or recesses is obtained and can be utilized further. It can be subjected to further machining/shaping or assembled or adhesively bonded to produce more complex structures.

In a fifth step, the porous C/C body is, if desired, post-densified to obtain a more usable workpiece.

In a preferred embodiment of the process of the invention, the carbon of the C/C body is converted at least partly into the corresponding carbides by infiltration with molten metals, where the term "metals" also comprises silicon, and, if appropriate, subsequent heat treatment. Preference is given to infiltration with molten silicon, in which case at least part of the carbon (preferably the carbon in the matrix) reacts to form silicon carbide; the matrix then comprises SiC, unreacted carbon and unreacted silicon. For this purpose, the C/C body is covered with silicon powder or silicon bodies and then heated under reduced pressure to temperatures of from about 1500 to about 1800° C. Depending on the intended use, it is not absolutely necessary to convert all of the C/C body into C/SiC, but it is usual for at least the outer layer to be converted into C/SiC. Although silicon melt infiltration is the preferred process, the C/C body can also be post-densified by means of other customary processes to form the matrices customary in composite materials technology. In particular, the liquid siliconisation process can also be carried out using silicon alloys which may further comprise, inter alia, metals such as Cr, Fe, Co, Ni, Ti and/or Mo.

The process described is preferably used for producing brake disks or clutch disks. Here, the press moulding composition and the cores are introduced into a cylindrical mold, with continuous layers of the press moulding composition preferably being introduced as lowermost and uppermost layers. The thickness of the bottom layer and of the covering layer after pressing is preferably at least 7 mm. These layers form the friction layer of the brake disk or clutch disk. The shaped body which forms the brake or clutch disk usually has the shape of an annulus, i.e. the region near the axis is open over the entire thickness of the disk. One or more cores are preferably arranged so that the hollow spaces formed are arranged in a rotation-symmetric manner about the axis of the cylinder, with at least 2 and not more than 16 hollow spaces preferably being created. The shape of the cores is preferably such that the hollow spaces formed extend from the periphery of the cylindrical shaped body to the internal edge of the shaped body and thus form an open passage between the internal and external cylindrical edges of the annulus.

During strengthening of the green body by pressing and/or curing, the workpiece is heated by passing electric current through it. Here, the current is introduced via the top and bottom surfaces of the cylindrical workpieces. In contrast to heating by means of heat conduction from the outside, this achieves uniform heating over the cross section and over the height of the cylindrical workpiece. The use of electrically conductive mold cores avoids local overheating and increases the heating efficiency. The latter can be utilized for reducing the pressing time.

The hollow bodies produced in this way can advantageously be used as friction bodies for clutches or brakes in motor vehicles, rail vehicles, aircraft, etc.

What is claimed is:

1. A process for producing hollow bodies comprising fiber-reinforced ceramic materials, where
   mold cores whose shape corresponds to that of the hollow spaces are produced in a first step,
   at least one mold core together with a press moulding composition or formable fiber composition are introduced into a mold, where the press moulding composition comprises carbon fibers and/or carbon filaments and thermally curable carbonizable binders, in such a way that the position of the cores corresponds to the desired position of the hollow spaces to be formed in a second step,
   the composition is cured by heating to a temperature of from 120° C. to 280° C., if appropriate under pressure, in a third step to form a green body,
   the cured green body is carbonized and/or graphitized in a fourth step by heating in a nonoxidizing atmosphere to a temperature of from about 750° C. to about 2400° C. to give a C/C body,
   wherein heating in the third and/or fourth step is at least partly effected by an electric current being passed through the pressable composition or the green body and through at least one mold core.

2. The process as claimed in claim 1, wherein, subsequent to the fourth step,
   the C/C body is infiltrated with liquid metal in a fifth step, with at least partial reaction of the carbon present in the matrix of the C/C body with the metal to form carbides.

3. The process as claimed in claim 2, wherein the liquid metal used is silicon or a silicon alloy.

4. The process as claimed in claim 1, wherein the electrical conductivity of the press moulding composition or formable fiber composition is above 0.1 S/m.

5. The process as claimed in claim 1, wherein the electrical conductivity of the green body is in the range from 0.1 to 50 S/m.

6. The process as claimed in claim 1, wherein the electrical conductivity of the mold cores is in the range from 0.1 to 100 times the conductivity of the press moulding composition, the formable fiber composition or the green body.

7. An electrically conductive mold core comprising polymers for producing hollow bodies comprising fiber-reinforced composites, wherein the mold cores contain a volume fraction of at least 5% of electrically conductive fibers and/or electrically conductive particles and have an electrical conductivity of at least 0.01 S/m.

8. A mold core as claimed in claim 7, wherein the electrically conductive fibers are selected from the group consisting of carbon fibers, graphite fibers, carbon-coated fibers, metal fibers, metal turnings and metal whiskers.

9. A mold core as claimed in claim 7, wherein the electrically conductive particles are selected from the group consisting of carbon particles, graphite particles, carbon black, metal grains, metal powder, metal flakes and metal grit.

* * * * *